United States Patent
Higuchi et al.

(10) Patent No.: US 8,614,626 B2
(45) Date of Patent: Dec. 24, 2013

(54) DRIVING SUPPORT DEVICE FOR A VEHICLE WITH REVERSE RUN DETERMINATION

(75) Inventors: Yuya Higuchi, Chiryu (JP); Kiyoshi Tsurumi, Obu (JP); Tomoki Kodan, Nagoya (JP); Motohiro Nakamura, Okazaki (JP); Masatoshi Takahara, Okazaki (JP); Shogo Sugimoto, Okazaki (JP); Naoto Miura, Nagoya (JP)

(73) Assignees: Denso Corporation, Kariya (JP); Toyota Jidosya Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 311 days.

(21) Appl. No.: 13/042,743

(22) Filed: Mar. 8, 2011

(65) Prior Publication Data

US 2011/0221585 A1  Sep. 15, 2011

(30) Foreign Application Priority Data

Mar. 11, 2010 (JP) ................................ 2010-054928

(51) Int. Cl.
*G08B 21/00* (2006.01)

(52) U.S. Cl.
USPC ............................ 340/438; 340/436; 701/301

(58) Field of Classification Search
USPC .......... 340/500, 540, 438, 435, 436; 701/400, 701/408, 409, 532, 533, 300, 301
See application file for complete search history.

(56) References Cited

U.S. PATENT DOCUMENTS

2008/0021638 A1   1/2008  Kobayashi

FOREIGN PATENT DOCUMENTS

| JP | A-2003-151077 | 5/2003 |
| JP | 2005-227092 A | 8/2005 |
| JP | A-2007-139531 | 6/2007 |
| JP | A-2009-129281 | 6/2009 |
| JP | 2009-168548 A | 7/2009 |

OTHER PUBLICATIONS

Office Action dated Feb. 4, 2013 in corresponding CN Patent Application No. 201110062206.3 (and English translation).
Office action mailed Oct. 1, 2013 in the corresponding JP application No. 2010-054928 (English translation).

*Primary Examiner* — Jeffery Hofsass
(74) *Attorney, Agent, or Firm* — Posz Law Group, PLC

(57) ABSTRACT

A driving support device includes: a position detector; a traveling direction detector; a map data memory; a map matching element for matching a current position of a vehicle on a road of map data; a traveling segment estimation element for estimating a current segment of the vehicle in the parking place road when a matched road is the parking place road; a main road search element for determining whether a segment of a main road of an express way is disposed in a predetermined search distance from an estimated current segment; and a reverse run determination element for determining whether the vehicle travels reversely when the main road search element determines that the segment of the main road is disposed in the predetermined search distance from the estimated current segment.

10 Claims, 5 Drawing Sheets

US 8,614,626 B2

DRIVING SUPPORT DEVICE FOR A VEHICLE WITH REVERSE RUN DETERMINATION

CROSS REFERENCE TO RELATED APPLICATION

This application is based on Japanese Patent Application No. 2010-54928 filed on Mar. 11, 2010, the disclosure of which is incorporated herein by reference.

FIELD OF THE INVENTION

The present invention relates to a driving support device for a vehicle that determines whether the vehicle travels reversely.

BACKGROUND OF THE INVENTION

When a vehicle travels reversely on an express way, a traffic accident such as accidental contact may occur. For example, when the vehicle goes out to a main road of the express way by mistake from an entrance ramp of a parking place (i.e., PP) such as a parking area and a service area on the express way, the vehicle travels reversely on the express way, so that possibility of traffic accident attributed to the reverse run becomes high. Thus, it is required to alert a driver to the reverse run after the reverse run is detected.

In electric map data used for an in-vehicle navigation device, the main road of the express way and a passage of the parking place such as the entrance ramp and an exit ramp are distinguished in link data. Information about a traveling direction is attached to the link data of the main road and the passage. Here, the information of the traveling direction is defined as a one-way traffic attribute data. Accordingly, when it is determined whether an actual traveling direction of the vehicle follows the one-way traffic attribute data, the reverse run on the passage of the parking place is determined. Then, it is possible to alert the reverse run.

However, in the parking place, there are three types of roads. When the vehicle travels on a certain type of the roads, the alert of the reverse run may not be required. The three types of the roads in the parking place on the express way will be explained with reference to FIG. 1. FIG. 1 shows the three types of the roads in the parking place. A solid line in FIG. 1 represents the main road of the express way. A broken line in FIG. 1 represents the passage in the parking place. A part IA of the passage surrounded with a dotted ellipsoid represents the entrance ramp of the parking place. A part IB of the passage surrounded with a dotted ellipsoid represents a parking area road of the parking place. A part IC of the passage surrounded with a dotted ellipsoid represents the exit ramp of the parking place. In FIG. 1, an arrow represents the one-way traffic attribute data.

As shown in FIG. 1, there are three types of the roads, i.e., the entrance ramp, the parking area road and the exit ramp in the parking place. When the vehicle travels on the parking area road, the vehicle sometimes travels reversely in order to park the vehicle in a parking frame. In this case, the vehicle travels reversely by necessary so that the traveling direction of the vehicle does not follow the one-way traffic attribute data. The driver does not intend to go out to the main road of the express way in a reverse manner. If the reverse run of the vehicle in the parking place is detected, and the reverse run is alerted, the alert may bother the driver. Thus, it is preferable to specify the entrance ramp and the exit ramp, and when the vehicle travels on the entrance ramp and the exit ramp in a reverse manner, the reverse run is alerted.

In view of the above difficulty, for example, JP-A-2003-151077 teaches that the reverse run is detected with using an in-road wireless element only when the vehicle travels on the entrance ramp and the exit ramp in the parking place. The on-road wireless element is arranged along with the entrance ramp, i.e., approach way from the main road of the express way to the parking place and the exit ramp, i.e., exit way from the parking place to the main road of the express way. Specifically, in JP-A-2003-151077, the on-road wireless element transmits information about the number of beacon, which specifies the entrance ramp and the exit ramp, to an in-vehicle wireless element. When the in-vehicle wireless element receives the information of the number of the beacon, the in-vehicle wireless element stores the information of the number of the beacon. When the in-vehicle wireless element receives the information of the same number of the beacon again, it is determined that the vehicle reversely travels on the entrance ramp or the exit ramp. Then, the alert of the reverse run is output.

JP-A-2007-139531 teaches that a conventional in-vehicle navigation device includes a database for providing reverse run prohibition road information of an automobile limited road (i.e., express way). Specifically, the road corresponding to the entrance ramp and the exit ramp is defined as a reverse run prohibition road, which is preliminary stored as the map data. Based on the position of the vehicle, the actual traveling direction of the vehicle and the reverse run prohibition road information, it is determined whether the vehicle travels on the reverse run prohibition road in a reverse direction. When it is determined that the vehicle travels reversely, the alert of the reverse run is output.

However, in JP-A-2003-151077, it is necessary to arrange the on-road wireless element on each entrance ramp and each exit ramp of a respective parking place of the express way, so that an infrastructure should be built up. Thus, a cost of the infrastructure is very high, and a system for the infrastructure is a large-scale system. Thus, it is difficult to realize the system.

In JP-A-2007-139531, it is necessary to attach the link data to the map data, and the link data provides to distinguish the entrance ramp, the parking area road and the exit ramp in the parking place. However, a conventional map data usually includes the link data, which provides to distinguish merely the main road of the express way and the road in the parking place. Thus, it is necessary to provide new map data. When the new map data is formed, time and effort are required. Thus, it is difficult to realize the new map data.

SUMMARY OF THE INVENTION

In view of the above-described problem, it is an object of the present disclosure to provide a driving support device for a vehicle that determines whether the vehicle travels reversely. The driving support device alerts reverse run of the vehicle only when the vehicle travels on an entrance ramp or an exit ramp in a parking place. It is easy to provide the driving support device.

According to an aspect of the present disclosure, a driving support device mounted on a vehicle includes: a position detector for detecting a current position of the vehicle; a traveling direction detector for detecting a traveling direction of the vehicle; a map data memory for storing map data including road data, wherein the road data distinguishes a parking place road in a parking place of an express way from a main road of the express way, defines a plurality of shaping points for showing a shape of a road including the parking place road and the main road, defines a length of a segment between two adjacent shaping points, and defines an one-way attribution of the road; a map matching element for executing a map matching process based on the current position, the traveling direction and the map data in such a manner that the current position of the vehicle matches on the road of the map data; a traveling segment estimation element for estimating a current segment of the parking place road, on which the vehicle travels, based on the current position when a matched road is the parking place road; a main road search element for searching a segment back or forth of an estimated current segment of the parking place road and for determining whether a segment of the main road of the express way is disposed in a predetermined search distance from the estimated current segment; and a reverse run determination element for determining based on the traveling direction and the one-way attribution of the parking place road whether the vehicle travels reversely when the main road search element determines that the segment of the main road of the express way is disposed in the predetermined search distance from the estimated current segment.

With utilizing conventional map data, the device determines whether the vehicle travels on reverse run alert object road. Thus, without building new infrastructure and new database, the device can alert the driver of the reverse run only when the vehicle travels on one of the entrance ramp and the exit ramp of the parking place.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
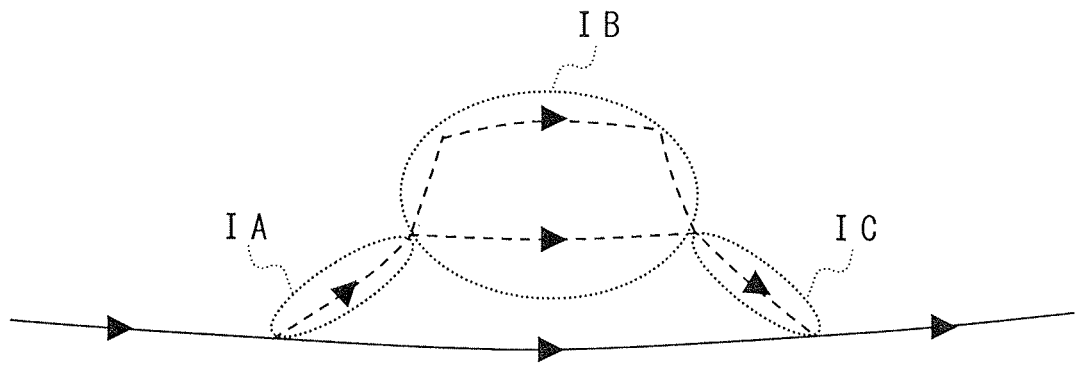
FIG. 1 is a diagram showing three types of roads in a parking place.
Figure 2:
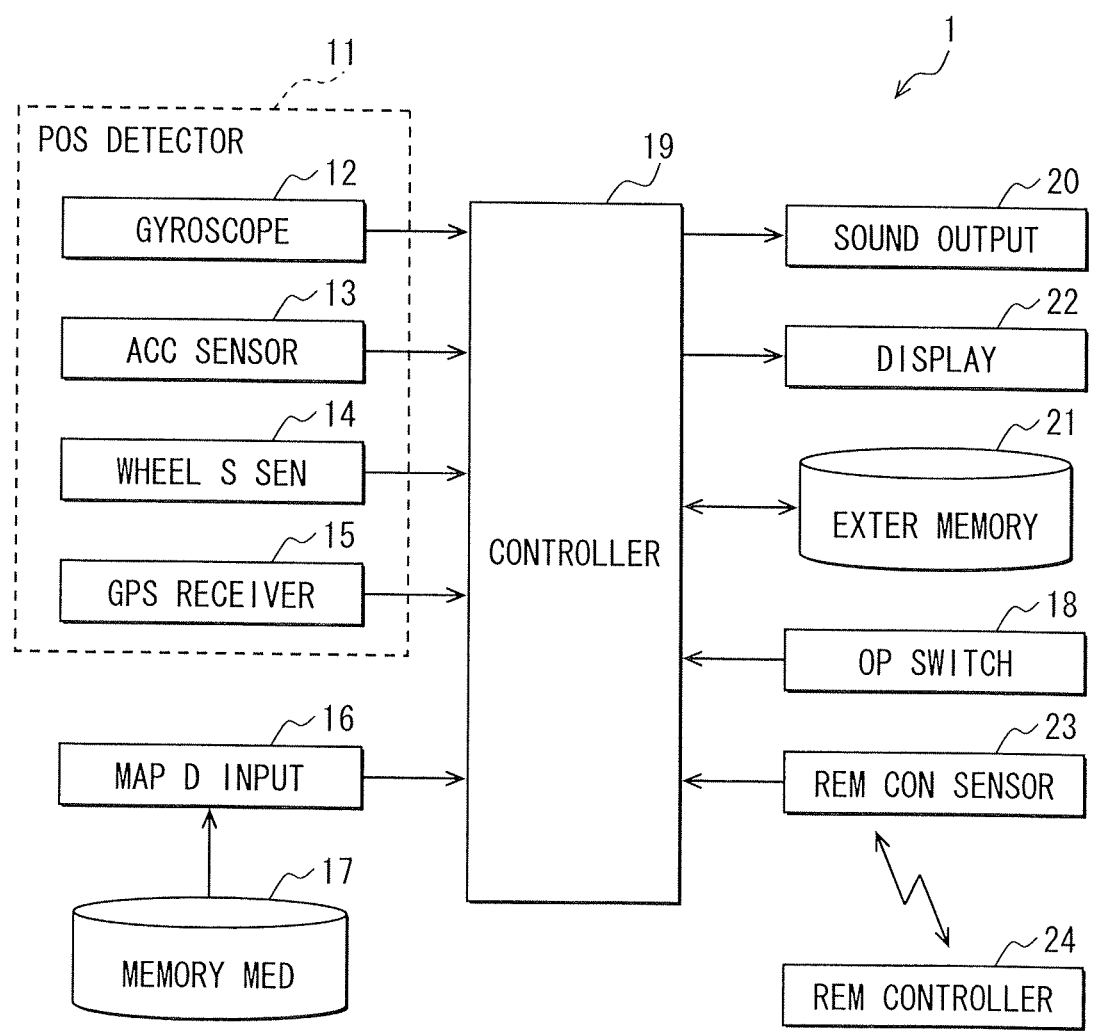
FIG. 2 is a block diagram showing an in-vehicle navigation device.

FIG. 2 shows a block diagram of an in-vehicle navigation device 1 according to an example embodiment. The navigation device 1 is mounted on a vehicle. The device 1 includes a position detector 11, a map data input element 16, a memory medium 17, operation switches 18, a sound output element 20, an external memory 21, a display element 22, a remote control sensor 23, a remote controller 24 and a controller 19. The controller 19 is coupled with the position detector 11, the map data input element 16, the memory medium 17, the operation switches 18, the sound output element 20, the external memory 21, the display element 22, the remote control sensor 23, and the remote controller 24. The navigation device 1 provides the driving support device for the vehicle. The vehicle on which the navigation device 1 is mounted is defined as a subject vehicle.

The position detector 11 includes an acceleration sensor 12 for detecting acceleration of the vehicle, a gyroscope 13 for detecting an angular speed of the vehicle around a vertical direction, a wheel speed sensor 14 for detecting a vehicle speed of the vehicle based on a rotation speed of each wheel of the vehicle, and a GPS receiver 15 for detecting a current position of the vehicle based on an electric wave from an artificial satellite in the GPS (grovel positioning system). The position detector detects the current position and a traveling direction of the vehicle periodically. Thus, the position detector 11 provides a position detection element and a traveling direction detection element.

Each of the gyroscope 12, the sensor 13-14 and the GPS receiver 15 has a different type of error. Thus, multiple ways to calculate the current position and the traveling direction are executed with using multiple elements 12-15 so that multiple ways with the elements 12-15 compensate with each other. When a certain element 12-15 has a sufficient accuracy, the position detector 11 may include only the certain element. Alternatively, the position detector 11 may further include a geomagnetic sensor, a rotation sensor for a steering wheel and a vehicle speed sensor.

A navigation method for determining the current position of the vehicle by verifying an estimate current position and an estimate traveling direction with road data is defined as an autonomous navigation method. The estimate current position and the estimate traveling direction are obtained from a measurement value of an orientation sensor such as the gyroscope 13 and measurement values of the acceleration sensor 12 and the wheel speed sensor 14. A navigation method for determining the current position of the vehicle by verifying an estimate current position with the road data is defined as an electric navigation method, the estimate current position being obtained by the GPS receiver 15 based on the electric wave signals transmitted from multiple artificial satellites. The navigation device 1 executes a hybrid navigation method, which is a combination of the autonomous navigation method and the electric navigation method.

The memory medium 17 is attached to the map data input element 16. The map data input element 16 inputs various data including a map matching data, the map data and a landmark data, which are stored in the memory medium 17. The map matching data, the map data and the landmark data provide to improve position detection accuracy. The map data includes road data, background data, character data and the like. The memory medium 17 is, for example, a CD-ROM, a DVD-ROM, a memory card or a HDD.

The road data includes link data and node data, which represent a road. A link (i.e., a road link) connects between nodes when each road on the map is divided at multiple nodes such as an intersection, a branch and a confluent. When each link connects between nodes, a road is restructured. When a shape of the road is not a straight line, a shape interpolation point (i.e., shaping point) is added between nodes in order to reproduce an actual shape of the road. In this case, a line segment connecting between the node and the shaping point or between shaping points is defined as a segment. The segment is disposed in a section divided by the shaping point. The link includes multiple segments.

The link data provides the unique number of a link for specifying the link (i.e., link ID), a link length showing a distance of the link, shape information of the link, a segment length showing a distance of a segment, a starting point coordinates of the link (i.e., starting node coordinates), an ending point coordinates of the link (i.e., ending node coordinates), the name of a road, the type of the road, a width of the road, an attribution of the road, an one-way attribution, the number of lanes in the road, existence of a right or left turn lane, the number of the right or left turn lanes, a speed limit of the road and the like.

Here, the road attribution provides at least distinction between the main road of the express way and the road in the parking place on the express way. The express way means a high way such as a interstate express way, an automobile limited road and an intercity express way with a parking place such as a service area and a parking area.

The link shape information includes a coordinate set showing coordinates of one end of the link, coordinates of the other end of the link and coordinates of the shaping point between the ends of the link. Accordingly, coordinates of the starting point of each segment and coordinates of the ending point of a respective segment are provided by the link data. The link data may not include the segment length data when the segment length is calculated from the coordinates of the starting point and the ending point of the segment. The coordinates of the starting and ending points correspond to the section length data of a section, which is divided between the shaping points. The memory medium 17 corresponds to the data memory.

The node data includes a node data ID showing the unique number of each node on the map, the node coordinates, the name of the node, the connection link ID showing the link ID of the link that is connected to the node, and the type of the intersection.

The background data associates facility data on the map and geographic data with coordinates of the map. Here, facility data includes the type of the facility, the name of the facility, the address of the facility and the like. The character data is used for displaying the name of a place, the name of the facility, the named of the road and the like on the map. The character data associates the character data with the coordinate data corresponding to a position on a map screen at which the character data is to be displayed.

The operation switches 18 include a touch switch and/or a mechanical switch, which are integrated into the display element 22. When an user operates the switches 18, various instructions such as a map scale change instruction, a menu display selection instruction, a destination setting instruction, a route search instruction, a route guiding instruction, a current position correction instruction, a display screen change instruction and a sound volume control instruction are input into the controller 19. Further, the operation switches 18 include a starting point setting switch and a destination setting switch. When the user operates the switches 18, the user can sets the starting point and the destination based on a preliminary registered point, the name of a facility, the telephone number, the address and the like.

The remote controller 24 includes multiple switches (not shown). When the user operates the switch of the remote controller 24, various instruction signals are input into the controller 19 via the remote control sensor 23. Thus, the same instructions as the operation switches 18 can be input into the controller 19 by the remote controller 24.

The sound output element 20 includes a speaker and the like. Based on the instruction from the controller 19, the sound output element 20 outputs a guidance voice message in case of the route guidance and an alert voice message or alert sound.

The external memory 21 is a large capacity storage device such as a HDD, which is capable of writing data therein. The external memory 21 stores a large amount of data and data not to be deleted even when an electric power turns off. Further, the memory 21 stores data, which is used very often and read out from the map data input element 16. The external memory 21 may be a removable memory having a comparatively small memory capacity.

The display element 22 displays a map screen for guiding a traveling route of the vehicle, a destination selection screen, an alert screen and the like. The display element 22 can display full color screen. The display element 22 is, for example, a liquid crystal display, an organic EL display, a plasma display and the like.

The controller 19 is a conventional computer. The controller 19 includes a CPU, a ROM, a RAM, a I/O element and a bus line (not shown), which couples the CPU, the ROM and the RAM. The controller 19 executes various processes of a navigation function based on various information and instructions input from the position detector 11, the map data input element 16, the operations witches 18, the external memory 21, the remote control sensor 23 and the like. The processes of the navigation function are, for example, a map scale change process, a menu selection process, a map matching process, a destination setting process, a route search process, a route guidance start process, a current position correction process, a display screen change process and a sound volume control process.

For example, the controller 19 determines based on information input from the position detector 11 and the map data input element 16 whether the vehicle travels reversely. When the controller 19 determines that the vehicle reversely runs, the controller 19 controls the sound output element 20 to output the alert sound or alert voice message. Alternatively, the controller 19 controls the display element 22 to display the alert screen. Thus, the controller 19 executes a driving support process for informing the driver of the alert.

Figure 3:
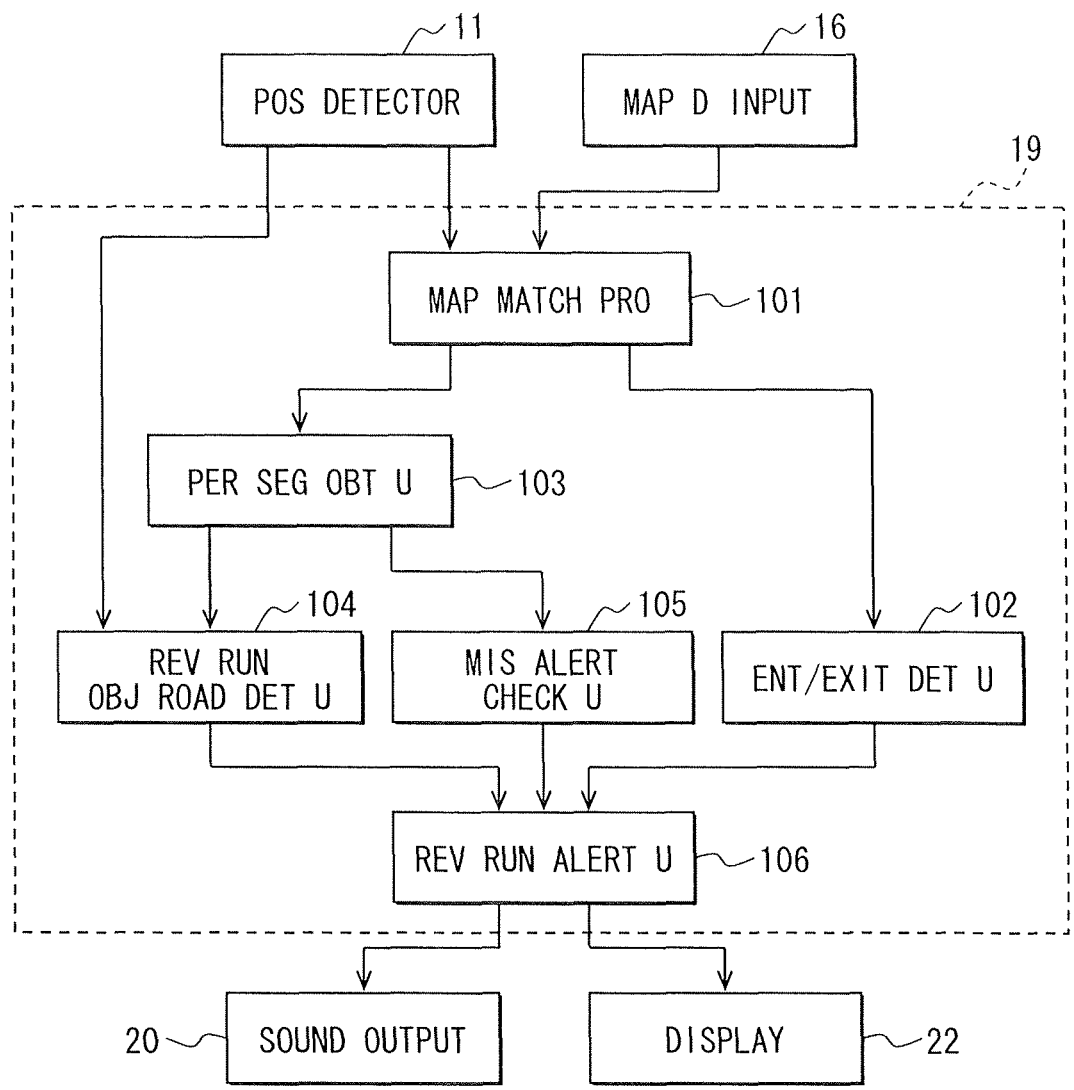
FIG. 3 is a block diagram showing a part of a controller that executes a driving support function.

Here, the driving support process in the controller 19 will be explained with reference to FIG. 3. FIG. 3 shows a function block diagram relating to the driving support process in the controller 19. As shown in FIG. 3, the controller 19 includes a map matching process unit 101, a parking place enter/exit determination unit 102, a periphery segment obtaining unit 103, a reverse run alert object road determination unit 104, a mistaken alert check unit 105 and a reverse run alert unit 106.

The map matching process unit 101 executes a map matching process. In the map matching process, the estimated current position and the estimated traveling direction determined by the hybrid navigation method and input from the position detector 11 with the road data input from the map data input element 16, so that the estimated current position of the vehicle is associated with a certain road of the map, i.e., a certain link of the map data. Thus, the map matching process unit 101 corresponds to a map matching element.

When the controller 19 executes the map matching process, the map matching process unit 101 calculates an estimation error range of the map matching process. The map matching process unit 101 further corresponds to an estimation error range calculator. A method for calculating the estimation error range may be a conventional method. For example, when an electric wave reception status in the GPS receiver 15 is not good, the unit 101 determines that accuracy of the estimated current position is low, and therefore, calculates a wide estimation error range. When the controller 19 detects based on diagnosis data of each element 12-15 that one of elements 12-15 malfunctions, the unit 101 determines that accuracy of the estimated current position is low, and therefore, calculates a wide estimation error range.

The parking place enter/exit determination unit 102 executes a parking place enter/exit determination process. In the parking place enter/exit determination process, the unit 102 determines based on the result of the map matching process whether the current position of the vehicle is disposed inside of the parking place or outside of the parking place.

Figure 4:
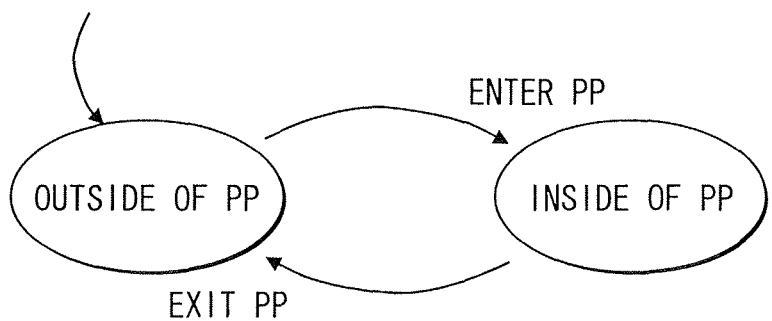
FIG. 4 is a diagram showing a state transition in an enter/exit determination process.

Here, a state transition in the enter/exit determination process will be explained with reference to FIG. 4. The parking place enter/exit determination unit 102 determines that the vehicle disposed in the parking place when a condition of the inside of the parking place is met. The unit 102 determines that the vehicle is disposed outside of the parking place when a condition of the outside of the parking place is met. For example, when the current position is matched with a link or a segment of the main road of the express way for a predetermined distance, and then, the current position is matched with a link or a segment of the parking place for a predetermined distance, the unit 102 determines that the vehicle enters into the parking place. When the unit 102 determines that the vehicle enters into the parking place, the condition of the inside of the parking place is met. When there is no link or segment of the parking place around the vehicle, and the current position is matched with a link or a segment other than the link and the segment of the parking place for a predetermined distance, the unit 102 determines that the vehicle exits the parking place. When the unit 102 determines that the vehicle exits the parking place, the condition of the outside of the parking place is met.

The periphery segment obtaining unit 103 executes the periphery segment obtaining process. In the periphery segment obtaining process, one or more segments are retrieved and selected in the estimation error range with respect to the estimated current position and the estimated traveling direction of the vehicle.

Figure 5:
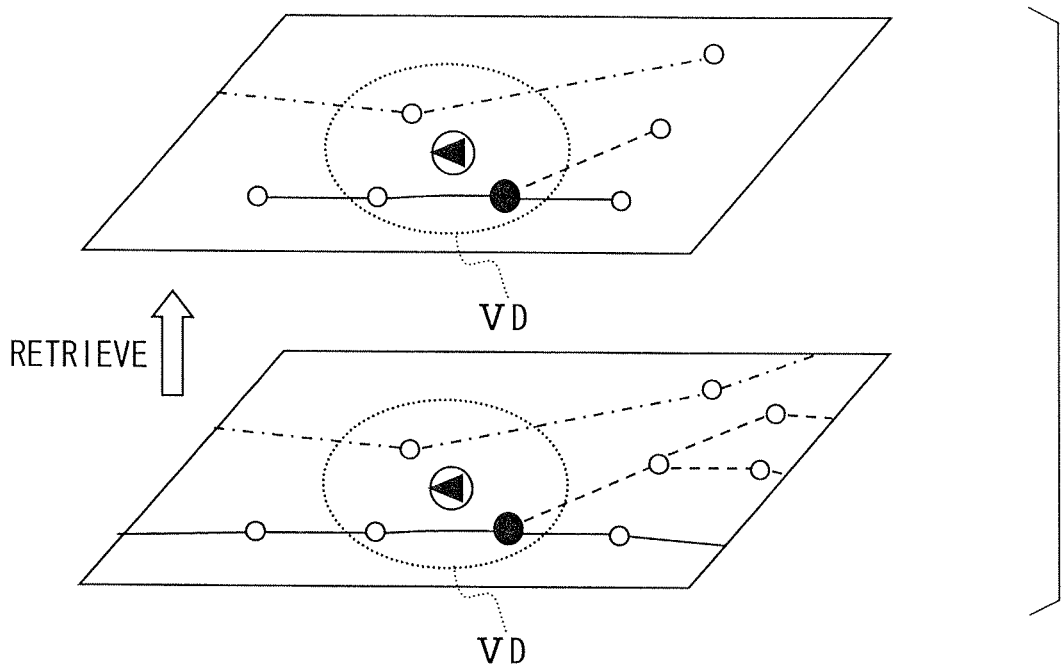
FIG. 5 is a diagram showing a retrieve step of a segment in a periphery segment obtaining process.

The selection of the segments in the periphery segment obtaining process will be explained with reference to FIG. 5. In FIG. 5, a mark shown as a combination of a white circle and a black triangle represents the estimated current position of the vehicle. An ellipsoid VD shows the estimation error range. A solid line represents a segment of the express way, and a broken line represents a segment of the parking place. A dashed-dotted line represents a segment of an ordinary road. Further, a black circle represents a node, and a white circle represents a shaping point. As shown in FIG. 5, in the periphery segment obtaining process, one ore more segments are retrieved when at least a part of a segment is disposed in the estimation error range.

The reverse run alert object road determination unit 104 executes the reverse run alert object road determination process. In the reverse run alert object road determination process, the unit 104 determines whether the segment retrieved in the periphery segment obtaining process corresponds to the entrance ramp or the exit ramp of the parking place. Specifically, the unit 104 executes a reverse run alert object road determination process for checking the entrance ramp or the exit ramp in the parking place.

Specifically, in the reverse run alert object road determination process, only the segments in the parking place (i.e., parking place segments) are retrieved from the segments obtained in the periphery segment obtaining process. Specifically, the reverse run alert object road determination unit 104 estimates the segment of the road in the parking place, on which the vehicle may be traveling. The reverse run alert object road determination unit 104 corresponds to a traveling section estimation element.

Next, the unit 104 searches a segment of the main road of the express way (i.e., a main road segment of the express way) within a predetermined search distance by searching segments in the road network just after or just before the retrieved parking place segments. The unit 104 corresponds to a search and determination element. When the unit 104 finds the main road segment, the unit 104 determines that the retrieved parking place segment is the reverse run alert object road. Then, the unit 104 decides that there is the reverse run alert object road in the parking place.

Figure 6A:
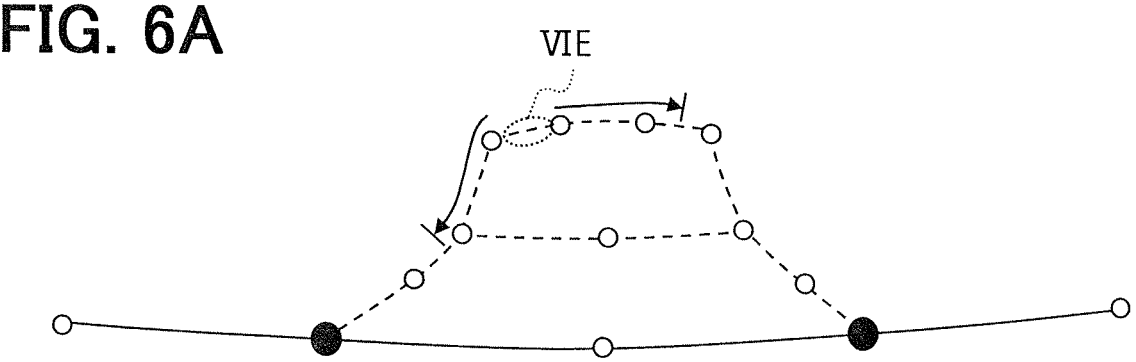
FIGS. 6A and 6B are diagrams showing an example of reverse run alert determination process.
Figure 6B:
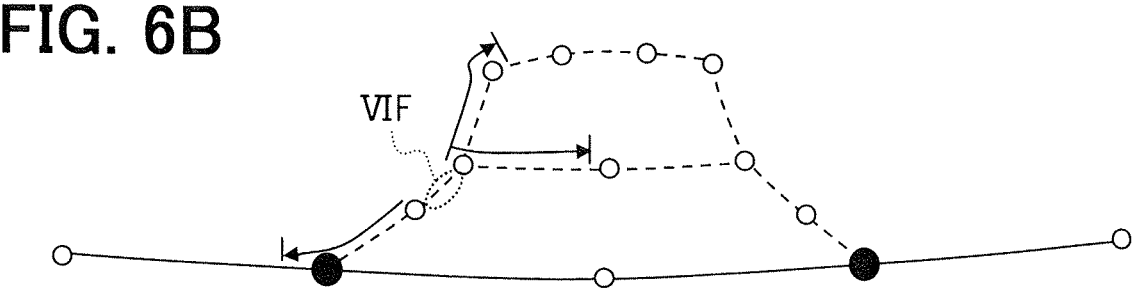

An example of the reverse run alert determination process will be explained with reference to FIGS. 6A and 6B. A region shown as arrows represents the predetermined search distance. A dotted ellipsoid VIE and a dotted ellipsoid VIF represent the parking place segments retrieved in the periphery segment obtaining process. A solid line in FIGS. 6A and 6B represents the main road segment. A broken line represents the parking place segment. Further, a black circle represents the node, and a white circle represents the shaping point.

As shown in FIG. 6A, the unit 104 determines in the reverse run alert object road determination process that the parking place segment VIE retrieved in the periphery segment obtaining process is not the reverse run alert object road in the parking place since the segment just before or just after the parking place segment VIE in the road network does not reach the main road segment within the search distance. Specifically, since the main road segment is not disposed within the search distance from the parking place segment VIE, the unit 104 determines that the parking place segment VIE is not the reverse run alert object road in the parking place. In this case, the unit 104 determines that the parking place segment VIE is a road in the parking place other than the reverse run alert object road, i.e., the unit 104 determines that the parking place segment VIE is a parking area road in the parking place. Thus, the unit 104 determines that there is no reverse run alert object road.

In the other hand, as shown in FIG. 6B, the unit 104 determines in the reverse run alert object road determination process that the parking place segment VIF retrieved in the periphery segment obtaining process is the reverse run alert object road in the parking place since the segment just before or just after the parking place segment VIF in the road network reaches the main road segment within the search distance. Specifically, since the main road segment is disposed within the search distance from the parking place segment VIF, the unit 104 determines that the parking place segment VIF is the reverse run alert object road in the parking place. In this case, the unit 104 determines that there is the reverse run alert object road in the parking place.

Here, the search distance will be explained. The search distance corresponds to a predetermined distance. The search distance is an index of the reverse run alert determination process. In this embodiment, the search distance is set to be equal to a length of the reverse run alert object road since the reverse run alert object road in the parking place is always connected to the main road of the express way, and the length of the reverse run alert object road is sufficiently large so that it is necessary for the vehicle to accelerate or decelerate sufficiently.

For example, the length of the entrance ramp and the length of the exit ramp in various types of parking places in this country or in this area are preliminary measured. A typical length of the entrance and exit ramps is obtained, and then, the typical length is determined as the search distance. The search distance such as 100 meters is preliminary stored in a memory of the controller 19. This search distance is used for the reverse run alert object road determination process. Here, the typical length may be an average of the length of the entrance and exit ramps in this country. Alternatively, the typical length may be an intermediate value of the length of the entrance and exit ramps in this country. Alternatively, the typical length may be determined based on both of the length of the entrance ramp and the length of the exit ramp. Alternatively, the typical length may be determined based on one of the length of the entrance ramp and the length of the exit ramp.

Figure 7:
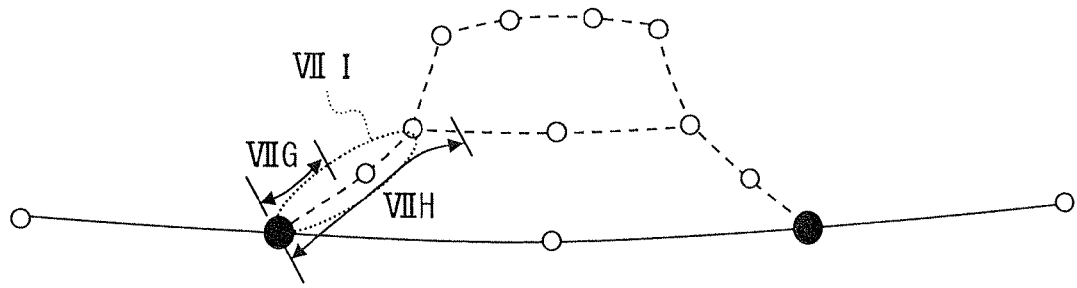
FIG. 7 is a diagram showing a mistaken determination case in the reverse run alert determination process.

When the search distance is constant, i.e., a fixed value, mistaken determination in the reverse run alert determination process may be occurred. Here, the cause of the mistaken determination will be explained with reference to FIG. 7. FIG. 7 is a diagram showing a mistaken determination case in the reverse run alert determination process. A range VIIG and a range VIIH shown in arrows in FIG. 7 are examples of the search distance. A part surrounded with a dotted ellipsoid VIII represents the entrance ramp of the parking place. A solid line represents the main road segment, and a broken line represents the parking place segment. A black circle represents the node, and a white circle represents the shaping point.

As shown in FIG. 7, in a case where the search distance is shorter than the length of the entrance ramp of the parking place, i.e., the length of the reverse run alert object road, the unit 104 does not determine that the parking place segment on which the vehicle runs is the reverse run alert object road even when the vehicle travels on the reverse run alert object road. This case is shown as the search distance VIIG in FIG. 7. However, in this case, the unit 104 determines that the parking place segment on which the vehicle runs is the reverse run alert object road before the vehicle merges into the main road of the express way. Accordingly, the device 1 can alert the driver of the reverse run before the vehicle merges into the main road and travels reversely on the main road.

On the other hand, when the search distance is longer than the length of the entrance ramp of the parking place, i.e., the length of the reverse run alert object road, the unit 104 determines that the parking place segment on which the vehicle runs is the reverse run alert object road even when the vehicle travels on the road of the parking place other than the reverse run alert object road. This case is shown as the search distance VIIH in FIG. 7. Thus, even when the vehicle travels on the parking place segment other than the reverse run alert object road, the device 1 alert the driver of the reverse run.

In view of the above mistaken determination cause, the search distance preliminary determined by statistics of the entrance ramps and the exit ramps in this country or this area is set to be an initial value, i.e., a default value. It is preferable to reset the search distance based on the parking place in which the vehicle travels. A method for resetting the search distance according to the parking place in which the vehicle runs will be explained. In this case, the search distance is variable. When the search distance is reset according to a certain parking place in which the vehicle travels, the search distance may be returned to the default value after the vehicle exits the certain parking place.

For example, the unit 104 traces from a branch between the main road of the express way and the parking place toward the segments of the parking place, and tries to find a branch of the parking place segment, which corresponds to a shaping point at which the parking place segment branches into multiple parking place segments. When the unit 104 finds the branch of the parking place segment, an integration length from the branch between the main road and the parking place to the branch of the parking place segment is calculated by the unit 104 based on each segment length in the map data input from the map data input element 16. The unit 104 sets the calculated integration length as the search distance of the parking place.

In the above case, the length of the reverse run alert object road of the parking place is set to be the search distance. Accordingly, the above mistaken determination cause is resolved, and the device 1 can determine with high accuracy whether the vehicle runs on the reverse run alert object road in the parking place.

Figure 8:
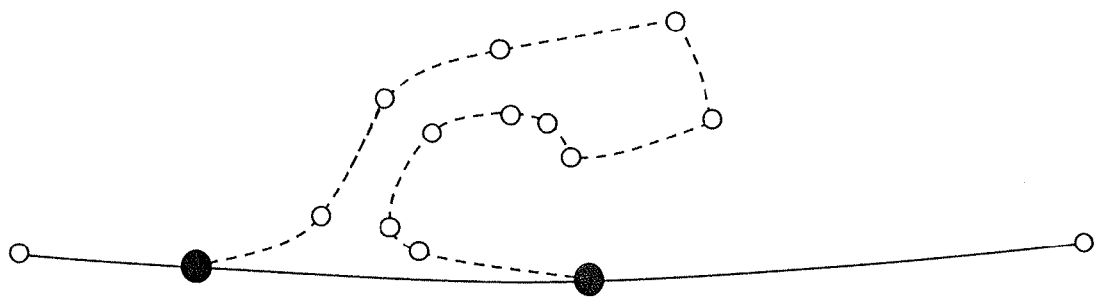
FIG. 8 is a diagram showing an example of a parking place.

As shown in FIG. 8, in some parking places, no branch of the parking place segment exists in the parking place. FIG. 8 shows merely an example of certain parking places. A solid line represents the main road segment, and a broken line represents the parking place segment. A black circle represents the node, and a white circle represents the shaping point. When no branch of the parking place segment exists in the parking place, it is impossible to set the integration length from the branch between the main road and the parking place to the branch of the parking place segment as the search distance. Thus, when the unit 104 does not find the branch of the parking place segment in the parking place, the integration length of all segments in the parking place is calculated by the unit 104 based on each segment length in the map data input from the map data input element 16. The unit 104 sets the search distance to be equal to the calculated integration length of all segments in the parking place. Thus, the reverse run alert object road determination unit 104 corresponds to a search distance setting element.

Specifically, a table showing a relationship between the integration length and the search distance is stored in a memory of the controller 19. Based on the integration length calculated by the unit 104, the unit 104 refers to the table so that the unit 104 obtains the search distance corresponding to the integration length. Thus, the unit 104 sets the search distance. Here, when a total length of a road in the parking place is long, the size of the parking place is large. Thus, in this case, the reverse run alert object road may be long. Thus, the relationship between the integration length and the search distance may be determined such that the search distance is long when the integration length is long.

For example, the integration length is classified into multiple groups in a stepwise manner according to a length. The upper limit group of the integration length is defined by the length equal to or larger than 1 kilometer. The lower limit group of the integration length is defined by the length smaller than 10 meters. The middle group among the classified groups of the integration length has the search distance of 100 meters. The middle group is defined as a standard group. A group having the integration length longer than the standard group has the search distance longer than 100 meters. A group having the integration length shorter than the standard group has the search distance shorter than 100 meters.

In the above case, since the search distance is set based on the integration length of all segments in the parking place, the search distance is close to an actual length of the reverse run alert object road.

When the unit 104 does not find the branch of the parking place segment, the unit 104 may set the default value of the search distance.

When the unit 104 does not execute the searching process for searching the branch of the parking place segment, but the parking place enter/exit determination unit 102 determines that the vehicle is disposed in the parking place, the unit 104 may calculate the integration length of all segments in the parking place based on each segment length in the map data input from the map data input element 16. The unit 104 may set the search distance of the parking place as the calculated integration length.

Alternatively, based on the link length data in the map data input from the map data input element 16, the unit 104 obtains the link length of the parking place. The unit 104 sets the search distance of the parking place according to the link length of the parking place.

As shown in FIG. 3, when the reverse run alert object road determination unit 104 determines that there is the parking place segment corresponding to the reverse run alert object road, the unit 104 determines whether the vehicle travels reversely on the reverse run alert object road based on the estimated current position, the estimated traveling direction and the on-way attribution of the parking place segment, i.e., the reverse run alert object road. Specifically, the unit 104 determines whether the vehicle runs in a wrong way or a right way.

Figure 9:
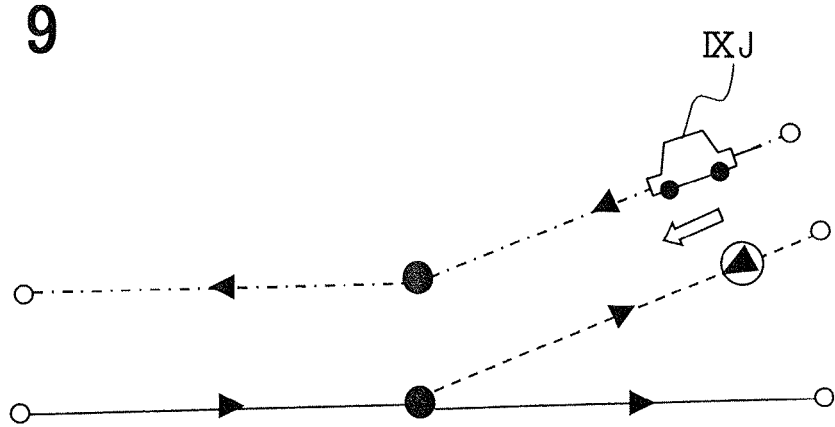
FIG. 9 is a diagram showing a determination process in a mistaken alert check unit.

The mistaken alert check unit 105 determines based on the estimated current position and the estimated traveling direction of the vehicle and the segment obtained in the periphery segment obtaining process whether a possibility that the vehicle does not run reversely on the reverse run alert object road in the parking place exists. Specifically, the unit 105 checks whether there is a possibility that the vehicle runs in a right way A determination process in the mistaken alert check unit 105 will be explained with reference to FIG. 9. In FIG. 9, a mark shown as a combination of a white circle and a black triangle represents the current position of the vehicle matched in the map matching process. A mark IXJ represents an actual current position of the vehicle. A white arrow represents a traveling direction of the vehicle. Further, a solid line represents a segment of the main road of the express way. A broken line represents a segment in the parking place. A dashed-dotted line represents a segment of an ordinary road. A black circle represents a node, and a white circle represents a shaping point. A black arrow represents a one-way attribution.

As shown in FIG. 9, the mistaken alert check unit 105 determines that there is a possibility that the vehicle does not run reversely on the reverse run alert object road in the parking place when there is a road in parallel to the reverse run alert object road within the estimation error range calculated in the map matching process unit 101. In FIG. 9, an ordinary road is disposed side by side with the reverse run alert object road.

The mistaken alert check unit 105 determines whether the vehicle can directly access, i.e., directly go into the ordinary road from the road in the parking place, on which the vehicle has traveled. When there is a road side by side with the reverse run alert object road in the estimation error range calculated in the map matching process unit 101, and the vehicle can directly access the ordinary road from the road in the parking place, the unit 105 determines that there is a possibility that the vehicle does not run reversely on the reverse run alert object road in the parking place.

The unit 105 determines whether the vehicle can directly go into the ordinary road from the road in the parking place, on which the vehicle has traveled. When there is a road side by side with the reverse run alert object road in the estimation error range calculated in the map matching process unit 101, and the vehicle can not directly access the ordinary road from the road in the parking place, the unit 105 determines that there is not a possibility that the vehicle does not run reversely on the reverse run alert object road in the parking place. The mistaken alert check unit 105 corresponds to a determination element of possibility of entering into and leaving from the road in the parking place.

Preferably, the unit 105 may determines based on the road data input from the map data input element 16 whether the vehicle can directly enter into and leave from the road in the parking place. Specifically, when one of the roads of the parking place is directly accessible to the ordinary road, the unit 105 determines that the vehicle can enter into and leaving from the road of the parking place. When all of the roads of the parking place are not directly accessible to the ordinary road, the unit 105 determines that the vehicle cannot enter into and leaving from the road of the parking place.

The reverse run alert unit 106 determines, based on the determination result of the unit 104 whether the vehicle runs in a wrong way or a right way on the reverse run alert object road and the determination result of the unit 105 whether there is a possibility that the vehicle does not run reversely on the reverse run alert object road, whether the vehicle runs reversely on the reverse run alert object road in the parking place.

Specifically, when the reverse run alert object road determination unit 104 determines that the vehicle runs in a wrong way on the reverse run alert object road, and the mistaken alert check unit 105 determines that there is not a possibility that the vehicle does not run reversely on the reverse run alert object road, the reverse run alert unit 106 determines that the vehicle runs reversely on the reverse run alert object road in the parking place. The reverse run alert unit 106 corresponds to a reverse run determination element. When the reverse run alert object road determination unit 104 determines that the vehicle runs in a wrong way on the reverse run alert object road, the reverse run alert unit 106 determines that the vehicle does not run reversely on the reverse run alert object road in the parking place. When the reverse run alert object road determination unit 104 determines that the vehicle runs in a wrong way on the reverse run alert object road, and the mistaken alert check unit 105 determines that there is a possibility that the vehicle does not run reversely on the reverse run alert object road, the reverse run alert unit 106 determines that the vehicle does not run reversely on the reverse run alert object road in the parking place.

When the reverse run alert unit 106 determines that the vehicle runs reversely on the reverse run alert object road in the parking place, the unit 106 controls the sound output element 20 to output an alert sound or an alert voice message for informing the user that the vehicle runs reversely. Alternatively, when the reverse run alert unit 106 determines that the vehicle runs reversely on the reverse run alert object road in the parking place, the unit 106 controls the display element 22 to display an alert screen for informing the user that the vehicle runs reversely. The sound output element 20 and the display element 22 correspond to an informing element.

Next, a driving support process in the controller 19 will be explained with reference to FIG. 10. The controller 19 starts to execute the driving support process when an ignition switch of the vehicle turns on, for example.

In step S1, the parking place enter/exit determination unit 102 executes the parking place enter/exit determination process. When the unit 102 determines that the vehicle is disposed in the parking place, i.e., when the determination in step S1 is "YES," it goes to step S2. When the unit 102 determines that the vehicle is not disposed in the parking place, i.e., when the determination in step S1 is "NO," it goes to step S7.

In step S2, the periphery segment obtaining unit 103 executes the periphery segment obtaining process, and then, it goes to step S3. In step S3, the reverse run alert object road determination unit 104 executes the reverse run alert object road determination process. When the unit 104 determines that one of the segments retrieved in the periphery segment obtaining process is the reverse run alert object road in the parking place, i.e., when the determination in step S3 is "YES," it goes to step S4. When the unit 104 determines that no segment retrieved in the periphery segment obtaining process is the reverse run alert object road in the parking place, i.e., when the determination in step S3 is "NO," it goes to step S7.

In step S4, the reverse run alert object road determination unit 104 determines whether the vehicle travels reversely on the reverse run alert object road in the parking place. When the reverse run alert object road determination unit 104 determines that the vehicle travels reversely on the reverse run alert object road in the parking place, i.e., the determination in step S4 is "YES," it goes to step S5. When the reverse run alert object road determination unit 104 determines that the vehicle does not travel reversely on the reverse run alert object road in the parking place, i.e., the determination in step S4 is "NO," it goes to step S7.

In step S5, the mistaken alert check unit 105 determines whether there is a possibility that the vehicle does not run reversely on the reverse run alert object road in the parking place. When the mistaken alert check unit 105 determines that there is a possibility that the vehicle does not run reversely on the reverse run alert object road in the parking place, i.e., when the determination of step S5 is "YES," it goes to step S6. When the mistaken alert check unit 105 determines that there is no possibility that the vehicle does not run reversely on the reverse run alert object road in the parking place, i.e., when the determination of step S5 is "NO," it goes to step S7.

In step S6, the reverse run alert unit 106 controls the sound output element 20 to output an alert sound or an alert voice message and controls the display element 22 to display an alert screen for informing the user that the vehicle runs reversely. Then, it goes to step S7. In step S7, when the ignition switch of the vehicle turns off, i.e., when the determination of step S7 is "YES," the process ends. When the ignition switch of the vehicle doe not turn off, i.e., when the determination of step S7 is "NO," it returns to step S1, and the process is repeated.

Figure 10:
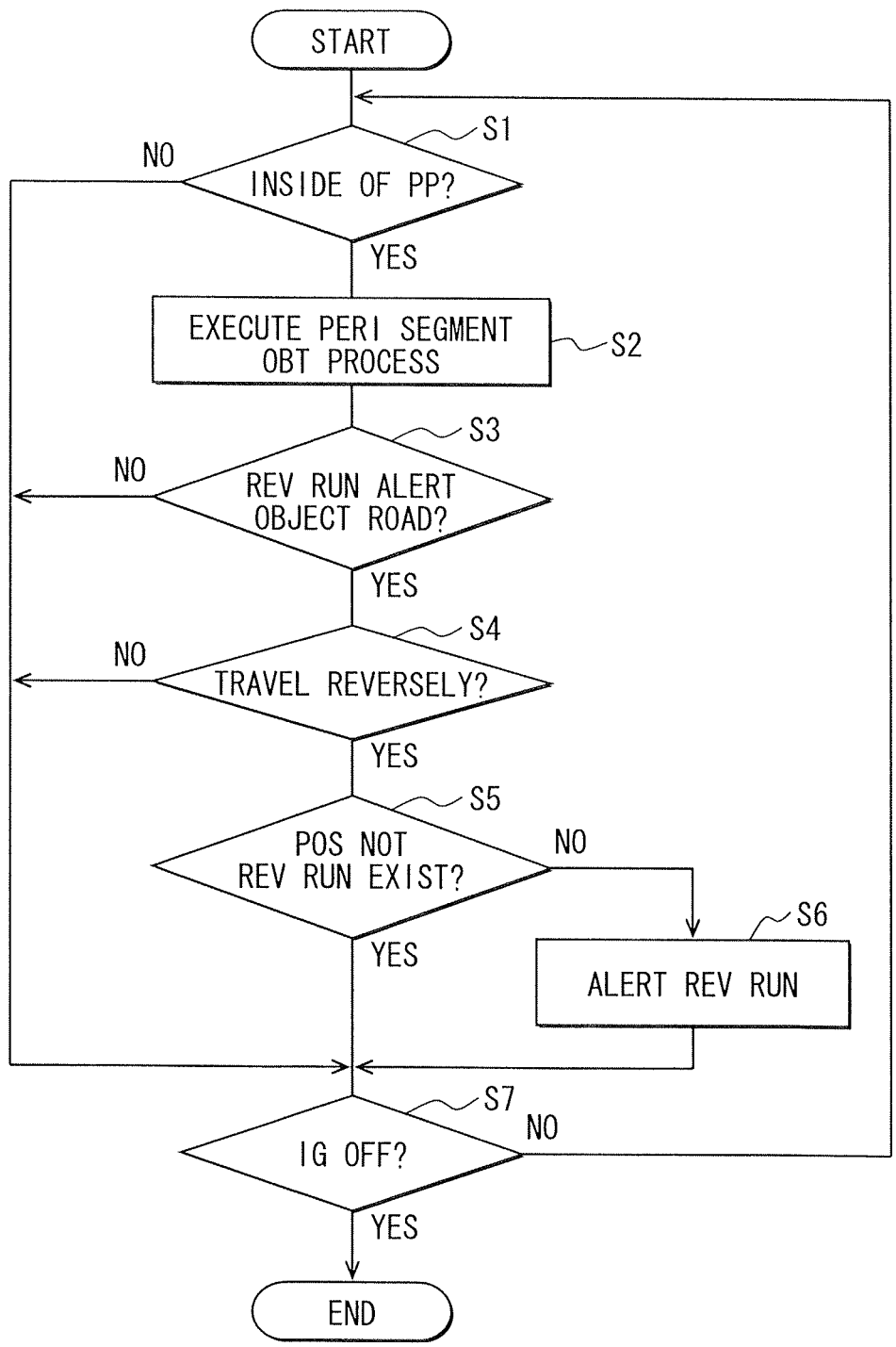
FIG. 10 is a flowchart showing a driving support process in the controller.

In FIG. 10, the controller 19 may start to execute the driving support process when an accessory switch of the vehicle turns on, and the controller 19 may stop to execute the driving support process when the accessory switch of the vehicle turns off.

In the above navigation device 1, with using the road data in a conventional map data, it is possible to determine whether the vehicle travels reversely, i.e., in a wrong way, on the reverse run alert object road in the parking place. Accordingly, without building new infrastructure and forming new database, the device 1 executes to alert the driver of the reverse run only when the vehicle travels on the reverse run alert object road.

Further, when an ordinary road is disposed side by side with the reverse run alert object road within the estimation error range calculated in the map matching process unit 101, the device 1 does not determine that the vehicle travels reversely. Accordingly, it is possible to restrict wrong alert of the reverse run.

In the above embodiment, in the reverse run alert object road determination process, the device searches a segment in the network just before or just after the retrieved segment in the parking place in order to try to find the main rod segment in the search distance. Alternatively, the device may search a segment of the parking place in the network in turn along with the traveling direction of the vehicle detected by the position detector 11 in order to find the main rod segment in the search distance.

In the above case, since the device searches a segment of the parking place in the network in turn along with the traveling direction of the vehicle detected by the position detector 11, and tries to find the main rod segment in the search distance, the device determines that the vehicle travels reversely before the vehicle reaches the main road of the express way when the vehicle exits the parking place from the entrance road of the parking place to the main road of the express way. Thus, the device alerts the driver of the reverse run before the main road of the express way. Further, since the device limits the search segments in the traveling direction of the vehicle, the process load for searching the segments is reduced. Since the process load is reduced, the searching time is also reduced.

In the above embodiment, the in-vehicle navigation device 1 mounted on the vehicle includes the driving support device for the vehicle that determines whether the vehicle travels reversely. Alternatively, other in-vehicle device capable of utilizing information of the position detector 11 and the map data input element 16 may include the driving support device.

The above disclosure has the following aspects.

According to an aspect of the present disclosure, a driving support device mounted on a vehicle includes: a position detector for detecting a current position of the vehicle; a traveling direction detector for detecting a traveling direction of the vehicle; a map data memory for storing map data including road data, wherein the road data distinguishes a parking place road in a parking place of an express way from a main road of the express way, defines a plurality of shaping points for showing a shape of a road including the parking place road and the main road, defines a length of a segment between two adjacent shaping points, and defines an one-way attribution of the road; a map matching element for executing a map matching process based on the current position, the traveling direction and the map data in such a manner that the current position of the vehicle matches on the road of the map data; a traveling segment estimation element for estimating a current segment of the parking place road, on which the vehicle travels, based on the current position when a matched road is the parking place road; a main road search element for searching a segment back or forth of an estimated current segment of the parking place road and for determining whether a segment of the main road of the express way is disposed in a predetermined search distance from the estimated current segment; and a reverse run determination element for determining based on the traveling direction and the one-way attribution of the parking place road whether the vehicle travels reversely when the main road search element determines that the segment of the main road of the express way is disposed in the predetermined search distance from the estimated current segment.

An entrance ramp and an exit ramp of the parking place, which are reverse run alert object roads in the parking place, are always connected to the main road of the express way. Thus, a length of each of the entrance ramp and the exit ramp is sufficiently large so that it is necessary for a driver to accelerate or decelerate the vehicle by a certain amount. Thus, based on existence of the main road within the predetermine search distance, it is easily determined whether the vehicle travels on the reverse run alert object road. Further, based on the traveling direction of the vehicle, it is easily determined whether the vehicle travels reversely on the reverse run alert object road. Accordingly, only when the vehicle travels on one of the entrance ramp and the exit ramp, the device alerts the driver of the reverse run. Here, a conventional map data includes information about shaping points and a length of each segment between two adjacent shaping points. Accordingly, with utilizing conventional map data, the device determines whether the vehicle travels on reverse run alert object road. Thus, without building new infrastructure and new database, the device can alert the driver of the reverse run only when the vehicle travels on one of the entrance ramp and the exit ramp of the parking place.

Alternatively, the driving support device may further include: an alert element for alerting an user that the vehicle travels reversely when the reverse run determination element determines that the vehicle travels reversely.

Alternatively, the driving support device may further include: a search distance setting element. The search distance setting element searches a plurality of segments in the parking place, based on the map data, from a first branch between the main road and an entrance ramp of the parking place toward the segments of the parking place road when the matched road is the parking place road. The search distance setting element totalizes length of the segments of the parking place road from the first branch to a second branch when the search distance setting element finds the second branch of the segments of the parking place road in the parking place. The search distance setting element sets the search distance to be equal to a total length of the segments of the parking place. In this case, when the second branch is disposed between the reverse run alert object road in the parking place and the parking place road other than the reverse run alert object road, the device determines with high accuracy whether the vehicle travels reversely on the reverse run alert object road.

Further, the search distance setting element may totalize length of all segments of the parking place road from the first branch to a third branch when the search distance setting element finds no second branch in the parking place. The third branch is disposed between an exit ramp of the parking place and the main road, and search distance setting element sets the search distance based on a total length of all segments of the parking place. In this case, even when the search distance setting element finds no second branch in the parking place, the device determines with high accuracy whether the vehicle travels reversely on the reverse run alert object road.

Alternatively, the driving support device may further include: a search distance setting element. The search distance setting element totalizes length of all segments of the parking place road from a first branch to a third branch when the matched road is the parking place road. The first branch is disposed between the main road and an entrance ramp of the parking place, and the third branch is disposed between an exit ramp of the parking place and the main road. The search distance setting element sets the search distance based on a total length of all segments of the parking place. In this case, the device determines with high accuracy whether the vehicle travels reversely on the reverse run alert object road.

Alternatively, the main road search element may search the segment from the estimated current segment of the parking place road in the traveling direction so that the main road search element determines whether the segment of the main road of the express way is disposed in the predetermined search distance from the estimated current segment. In this case, the device determine whether the vehicle travels reversely on the reverse run alert object road before the vehicle reaches the main road of the express way.

Alternatively, the driving support device may further include: an estimation error range calculator for calculating an estimation error range of the traveling segment estimation element. The reverse run determination element determines that the vehicle does not travel reversely when there is a road disposed side by side with the estimated current segment of the parking place road within the estimation error range. In this case, the device does not execute wrong alert of the reverse run.

Alternatively, the driving support device may further include: an estimation error range calculator for calculating an estimation error range of the traveling segment estimation element; and a possibility determination element for determining whether the parking place road is directly accessible to an ordinary road. The reverse run determination element determines that the vehicle does not travel reversely when there is a road disposed side by side with the estimated current segment of the parking place road within the estimation error range, and the possibility determination element determines that the parking place road is directly accessible to the ordinary road. The reverse run determination element determines whether the vehicle travels reversely when there is a road disposed side by side with the estimated current segment of the parking place road within the estimation error range, and the possibility determination element determines that the parking place road is not directly accessible to the ordinary road. In this case, there is no possibility that the vehicle travels on the ordinary road side by side with the reverse run alert object road. Thus, the device execute alert of the reverse run when the vehicle travels reversely. Further, when there is a possibility that the vehicle does not travel reversely, the device does not execute wrong alert.

Further, the reverse run determination element may determine that the road disposed side by side with the estimated current segment of the parking place road is not the ordinary road when there is the road disposed side by side with the estimated current segment of the parking place road within the estimation error range, and the possibility determination element determines that the parking place road is not directly accessible to the ordinary road.

Alternatively, the reverse run determination element may determine that the vehicle travels on an entrance ramp or an exit ramp of the parking place when the main road search element determines that the segment of the main road of the express way is disposed in the predetermined search distance from the estimated current segment. The reverse run determination element determines based on the traveling direction and the one-way attribution whether the vehicle travels reversely when the reverse run determination element determines that the vehicle travels on the entrance ramp or the exit ramp of the parking place. The reverse run determination element determines that the vehicle travels on the parking road other than the entrance ramp and the exit ramp of the parking place when the main road search element determines that the segment of the main road of the express way is not disposed in the predetermined search distance from the estimated current segment. The reverse run determination element determines that the vehicle does not travel reversely when the reverse run determination element determines that the vehicle travels on the parking road other than the entrance ramp and the exit ramp of the parking place.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A driving support device mounted on a vehicle comprising:
    a position detector for detecting a current position of the vehicle;
    a traveling direction detector for detecting a traveling direction of the vehicle;
    a map data memory for storing map data including road data, wherein the road data distinguishes a parking place road in a parking place of an express way from a main road of the express way, defines a plurality of shaping points for showing a shape of a road including the parking place road and the main road, defines a length of a segment between two adjacent shaping points, and defines an one-way attribution of the road;
    a map matching element for executing a map matching process based on the current position, the traveling direction and the map data in such a manner that the current position of the vehicle matches on the road of the map data;
    a traveling segment estimation element for estimating a current segment of the parking place road, on which the vehicle travels, based on the current position when a matched road is the parking place road;
    a main road search element for searching a segment back or forth of an estimated current segment of the parking place road and for determining whether a segment of the main road of the express way is disposed in a predetermined search distance from the estimated current segment; and
    a reverse run determination element for determining based on the traveling direction and the one-way attribution of the parking place road whether the vehicle travels reversely when the main road search element determines that the segment of the main road of the express way is disposed in the predetermined search distance from the estimated current segment.

2. The driving support device according to claim 1, further comprising:
    an alert element for alerting an user that the vehicle travels reversely when the reverse run determination element determines that the vehicle travels reversely.

3. The driving support device according to claim 1, further comprising:
    a search distance setting element,
    wherein the search distance setting element searches a plurality of segments in the parking place, based on the map data, from a first branch between the main road and an entrance ramp of the parking place toward the segments of the parking place road when the matched road is the parking place road,
    wherein the search distance setting element totalizes length of the segments of the parking place road from the first branch to a second branch when the search distance setting element finds the second branch of the segments of the parking place road in the parking place, and
    wherein the search distance setting element sets the search distance to be equal to a total length of the segments of the parking place.

4. The driving support device according to claim 3,
    wherein the search distance setting element totalizes length of all segments of the parking place road from the first branch to a third branch when the search distance setting element finds no second branch in the parking place,
    wherein the third branch is disposed between an exit ramp of the parking place and the main road, and
    wherein search distance setting element sets the search distance based on a total length of all segments of the parking place.

5. The driving support device according to claim 1, further comprising:
    a search distance setting element,
    wherein the search distance setting element totalizes length of all segments of the parking place road from a first branch to a third branch when the matched road is the parking place road,
    wherein the first branch is disposed between the main road and an entrance ramp of the parking place, and the third branch is disposed between an exit ramp of the parking place and the main road, and
    wherein the search distance setting element sets the search distance based on a total length of all segments of the parking place.

6. The driving support device according to claim 1,
    wherein the main road search element searches the segment from the estimated current segment of the parking place road in the traveling direction so that the main road search element determines whether the segment of the main road of the express way is disposed in the predetermined search distance from the estimated current segment.

7. The driving support device according to claim 1, further comprising:
    an estimation error range calculator for calculating an estimation error range of the traveling segment estimation element,
    wherein the reverse run determination element determines that the vehicle does not travel reversely when there is a road disposed side by side with the estimated current segment of the parking place road within the estimation error range.

8. The driving support device according to claim 1, further comprising:
    an estimation error range calculator for calculating an estimation error range of the traveling segment estimation element; and
    a possibility determination element for determining whether the parking place road is directly accessible to an ordinary road,
    wherein the reverse run determination element determines that the vehicle does not travel reversely when there is a road disposed side by side with the estimated current segment of the parking place road within the estimation error range, and the possibility determination element determines that the parking place road is directly accessible to the ordinary road, and
    wherein the reverse run determination element determines whether the vehicle travels reversely when there is a road disposed side by side with the estimated current segment of the parking place road within the estimation error range, and the possibility determination element determines that the parking place road is not directly accessible to the ordinary road.

9. The driving support device according to claim 8,
    wherein the reverse run determination element determines that the road disposed side by side with the estimated current segment of the parking place road is not the ordinary road when there is the road disposed side by side with the estimated current segment of the parking place road within the estimation error range, and the possibility determination element determines that the parking place road is not directly accessible to the ordinary road.

10. The driving support device according to claim 1, wherein the reverse run determination element determines that the vehicle travels on an entrance ramp or an exit ramp of the parking place when the main road search element determines that the segment of the main road of the express way is disposed in the predetermined search distance from the estimated current segment, wherein the reverse run determination element determines based on the traveling direction and the one-way attribution whether the vehicle travels reversely when the reverse run determination element determines that the vehicle travels on the entrance ramp or the exit ramp of the parking place, wherein the reverse run determination element determines that the vehicle travels on the parking road other than the entrance ramp and the exit ramp of the parking place when the main road search element determines that the segment of the main road of the express way is not disposed in the predetermined search distance from the estimated current segment, and wherein the reverse run determination element determines that the vehicle does not travel reversely when the reverse run determination element determines that the vehicle travels on the parking road other than the entrance ramp and the exit ramp of the parking place.

* * * * *

UNITED STATES PATENT AND TRADEMARK OFFICE
CERTIFICATE OF CORRECTION

| | |
|---|---|
| PATENT NO. | : 8,614,626 B2 |
| APPLICATION NO. | : 13/042743 |
| DATED | : December 24, 2013 |
| INVENTOR(S) | : Higuchi et al. |

It is certified that error appears in the above-identified patent and that said Letters Patent is hereby corrected as shown below:

Title page, item 73

Assignees: should read -- DENSO CORPORATION, Kariya-city Japan, TOYOTA JIDOSHA KABUSHIKI KAISHA, Toyota-city Japan and AISIN AW CO., LTD., Anjo-city, Japan --

Signed and Sealed this
Twenty-eighth Day of January, 2014

Michelle K. Lee
*Deputy Director of the United States Patent and Trademark Office*